US010627333B2

(12) United States Patent
Gleissner et al.

(10) Patent No.: US 10,627,333 B2
(45) Date of Patent: Apr. 21, 2020

(54) IRRADIANCE INTENSITY ADJUSTMENT DEVICE

(71) Applicant: ATLAS Material Testing Technology GmbH, Linsengericht-Altenhaßlau (DE)

(72) Inventors: Christoph Gleissner, Ruesselsheim (DE); Enrico Hetzer, Riedstadt (DE)

(73) Assignee: ATLAS Material Testing Technology GmbH, Linsengericht-Altenhasslau (DE)

( * ) Notice: Subject to any disclaimer, the term of this patent is extended or adjusted under 35 U.S.C. 154(b) by 149 days.

(21) Appl. No.: 15/939,900

(22) Filed: Mar. 29, 2018

(65) Prior Publication Data

US 2018/0321132 A1 Nov. 8, 2018

(30) Foreign Application Priority Data

Mar. 29, 2017 (EP) .................................... 17163613

(51) Int. Cl.

| | |
|---|---|
| ***G01N 17/00*** | (2006.01) |
| ***F21S 8/00*** | (2006.01) |
| ***F21V 9/02*** | (2018.01) |
| ***F21V 14/08*** | (2006.01) |
| ***G02B 26/02*** | (2006.01) |
| ***F21V 9/08*** | (2018.01) |
| ***G02B 5/20*** | (2006.01) |

(52) U.S. Cl.

CPC ............ *G01N 17/004* (2013.01); *F21S 8/006* (2013.01); *F21V 9/02* (2013.01); *F21V 9/08* (2013.01); *G02B 5/205* (2013.01); *G02B 26/023* (2013.01); *F21V 14/08* (2013.01); *G01N 17/002* (2013.01)

(58) Field of Classification Search

CPC ..... G01N 17/004; G01N 17/002; F21S 8/006; F21V 9/02; F21V 9/08; F21V 14/08; G02B 5/205; G02B 26/023

USPC ................................ 250/493.1, 494.1, 505.1

See application file for complete search history.

(56) References Cited

U.S. PATENT DOCUMENTS

| | | | | |
|---|---|---|---|---|
| 5,282,115 | A | 1/1994 | McGuire | |
| 2002/0122305 | A1 | 9/2002 | Adelhelm | |
| 2007/0088193 | A1* | 4/2007 | Omori | A61B 1/00126 600/101 |
| 2007/0253215 | A1 | 11/2007 | Takahashi et al. | |
| 2007/0267056 | A1 | 11/2007 | Hishikawa | |
| 2011/0019388 | A1* | 1/2011 | Cao | F21S 8/006 362/1 |
| 2012/0223733 | A1 | 9/2012 | Gunawan et al. | |

FOREIGN PATENT DOCUMENTS

| | | | |
|---|---|---|---|
| DE | 102013227096 | A1 | 10/2014 |
| WO | 93/24786 | A1 | 12/1993 |
| WO | 2011033025 | A1 | 3/2011 |

OTHER PUBLICATIONS

EP Search Report cited in EP Application No. 17 163 613.7 dated Jun. 2, 2017, 2 pages.

* cited by examiner

*Primary Examiner* — Nicole M Ippolito

(74) *Attorney, Agent, or Firm* — Cooper Legal Group, LLC

(57) ABSTRACT

An irradiance adjustment device comprising a radiation source and at least one neutral density filter disposed adjacent to the radiation source, wherein the neutral density filter can be moved into or out of the beam path of the radiation source.

18 Claims, 7 Drawing Sheets

IRRADIANCE INTENSITY ADJUSTMENT DEVICE

RELATED APPLICATIONS

This application claims priority to European Patent Application 17 163 613.7, filed on Mar. 29, 2017, which is incorporated herein by reference.

TECHNICAL FIELD

The present disclosure refers to a device for adjusting the irradiance of light emitted from a radiation source, the use of a woven metal wire or stainless steel wire as a neutral density filter in a device for adjusting the irradiance, and the use of such a device in a device for testing the effect of light radiation on an object.

BACKGROUND

Devices for the simulation of sunlight, also called sun simulators, have been known for some time. A sun simulator can be used to investigate the effects of sunlight on certain objects to be irradiated under laboratory conditions. Since natural sunlight is subject to strong temporal fluctuations, the use of a sun simulator has the advantage over outdoor tests that measurements can be carried out and reproduced under defined, continuous, day and seasonally independent conditions.

For example, it is known that sunlight can damage polymeric materials. As a rule, it initiates the degradation process which can accelerate in interaction with temperature, humidity and other influences. It is just as important to understand the effects of heat input via the sun on assemblies and ultimately on the entire product. This is where important findings on operability under heat load are gained and temperature management and product stability are checked.

The application and application possibilities of sun simulators range from small laboratory and walk-in chambers for component or assembly testing, to drive-in chambers for complete vehicles and large hall systems for trucks, trains or airplanes. In addition, the highest possible spectral match of the artificial light source with natural sunlight is decisive for the quality of the test conditions to be simulated and their reliable repeatability. In case of deviations, spectral optical filters can be used to match the spectrum to that of sunlight.

SUMMARY

According to a first aspect of the disclosure, an irradiance adjusting device comprises a radiation source and at least one neutral density filter disposed adjacent to the radiation source, wherein the neutral density filter can be moved into or out of the radiation path of the radiation source.

According to a second aspect of the disclosure, a computer program product is designed to control a device according to the first aspect.

According to a third aspect of the disclosure, a woven metal or stainless steel wire is used as a neutral density filter in an irradiance adjustment device.

According to a fourth aspect of the disclosure, a device for testing the effect of light radiation on an object comprises at least one device according to the first aspect and a device for accommodating an object to be irradiated.

The person skilled in the art recognizes additional features and advantages when reading the detailed description and the enclosed drawings below.

SHORT DESCRIPTION OF THE DRAWINGS

The enclosed drawings are examples of implementation and, together with the description, serve to explain the principles of this disclosure as well as details of the implementation examples.

FIG. 1 shows a schematic cross-sectional view of a device for adjusting the irradiance according to an example which illustrates the basic principle of the present disclosure.

FIG. 2 comprises FIGS. 2A to 2D and shows different views of a device for adjusting the irradiance according to an example, in which the device comprises two neutral density filters mounted in filter frames and pivoted around the radiation source.

FIG. 3 includes FIGS. 3A to 3C and shows views of technical details for the realization of a device according to FIG. 2 in accordance with an example.

FIG. 4 comprises FIGS. 4A to 4D and shows two different views of a device according to FIG. 2 at different positions of the two neutral density filters according to an example.

DETAILED DESCRIPTION

In the following detailed description, reference is made to the enclosed drawings which form part of these and in which specific examples of implementation are shown for illustrative purposes, in which the present disclosure can be exercised. In this respect, directional terminology such as "top", "bottom", "front", "back", "front", "back", etc. with reference to the orientation of the described figure(s) is used. Since components of examples of the implementation of this disclosure can be positioned in a number of different orientations, the directional terminology serves as an illustration and is in no way restrictive. It is understood that other examples of implementation may be used and structural or logical changes may be made without departing from the scope of protection of this disclosure. The following detailed description is therefore not to be understood in a restrictive sense and the scope of protection of this disclosure is defined by the claims attached.

FIG. 1 schematically shows a basic example of a device for adjusting the irradiance according to the first aspect of the present disclosure. Accordingly, device 10 according to the first aspect comprises a radiation source 11 and at least one neutral density filter 12 located adjacent to the radiation source 11. The neutral density filter 12 is arranged in such a way that the radiation emitted by radiation source 11 passes through the neutral density filter 12. As indicated by the double arrow, the neutral density filter 12 is arranged so that it can be moved into the beam path of the radiation source 11 or out of the beam path of the radiation source 11.

In the following, examples and further embodiments of the device according to the first aspect are presented on the basis of particular features. These features can be used individually or in combination with each other. Some of these features have been implemented in the examples shown in FIGS. 2 to 4 and will be described in detail below.

According to an example of device 10 after the first aspect, it comprises at least one additional neutral density filter 13 (shown dashed). In the same way as the neutral density filter 12, this can be arranged movable in or out of the beam path of the radiation source 11, in particular independently of the neutral density filter 12, such as is indicated by a further double arrow. The further neutral density filter 13 in the beam path can be positioned at a position other than the neutral density filter 12, so that the two neutral density filters 12 and 13 can be arranged one after the other in the beam path. Neutral density filters 12 and 13 can have the same or different degrees of density and thus transmission rates, whereby in the latter case, depending on the position of the neutral density filters 12 and 13 in the beam path or outside it, four different amounts of the irradiance in the beam path behind the neutral density filters 12 and 13 can be adjusted.

According to an example of the first aspect of device 10, radiation source 11 comprises a housing 11.1 and a light source 11.2 fixed in the housing 11.1. According to another example, light source 11.2 is designed to emit a spectrum that approximates the solar spectrum as closely as possible. According to another example, appropriate optical filters can be arranged inside or outside the housing 11.1 to further improve the approximation of the spectrum to the solar spectrum. According to another example, the light source 11.2 can be given by a metal halide lamp. According to another example, the light source 11.2 can be given by a xenon lamp.

According to an example of the device 10 according to the first aspect, the at least one neutral density filter 12 comprises a woven metal wire or stainless steel wire, in particular in the form of a fabric. In particular, such a fabric may comprise a plurality, i.e. more than two, of such wires which are connected, in particular interwoven with each other. More specifically, the neutral density filter may comprise a plurality, i.e. more than two, first wires extending in a first direction, and a plurality of second wires extending in a second direction, wherein the first direction is perpendicular to the second direction and the first wires are interwoven with the second wires. According to another example, the transmittance of such a neutral density filter can be adjusted via the density of the fabric, in particular the distance of adjacent wires between each other. According to another example, the woven metal or stainless steel wire or wires can be blackened.

According to an example of device 10 according to the first aspect, the at least one neutral density filter 12 comprises a perforated foil or a perforated plate. According to another example, the transmittance of such a neutral density filter can be adjusted in the case of equidistant perforated films or sheets by the size of the holes or the ratio of the perforated surface to the total area. According to another example, the foil or sheet may be blackened.

According to further examples of device 10 according to the first aspect, at least one neutral density filter 12 can also be provided by neutral or gray glasses or neutral reflection filters.

According to an example of device 10 according to the first aspect, the light output of light source 11.2 is adjustable or dimmable. According to another example, the light output can be regulated by means of a control unit such as an electric ballast.

According to an example of device 10 according to the first aspect, the at least one neutral density filter 12 is arranged along a flat or curved surface. According to a further example, the at least one neutral density filter 12 is arranged along a section of a cylindrical surface, in particular adjacent to the cylindrical surface.

According to an example of device 10 according to the first aspect, the at least one neutral density filter 12 is movable by a mechanical adjustment device. According to a further example, the mechanical adjustment device is connected to the housing 11.1 of the radiation source 11, in particular directly connected to the housing 11.1 of the radiation source 11.

According to an example of device 10 according to the first aspect, the at least one neutral density filter 12 is arranged such that it can be pivoted around the radiation source 11. According to an example, the arrangement is such that the neutral density filter 12 can be swiveled on a circular path around the central light source 11.2. According to another example, two or more neutral density filters can be swiveled on a circular path around the light source located in the center, whereby the circular paths have different radii, so that the neutral density filters move on different paths and thus do not interfere with each other's movement.

In accordance with an example of device 10 according to the first aspect, it also comprises at least one filter frame in which the at least one neutral density filter 12 can be fixed, wherein one or more neutral density filters can be attached to such a filter frame. According to an example, the device 10 comprises a plurality of such filter frames, which are independent of each other.

In accordance with an example of a device 10 according to the first aspect, it also comprises a drive unit, in particular a motor, which is connected to the at least one neutral density filter 12 in order to set it in motion. If there is a filter frame for receiving at least one neutral density filter 12, the drive unit may be connected to the filter frame. According to another example of this, device 10 also comprises a computer program which is configured to drive the drive unit in a desired manner. Such a computer program can, for example, be designed to simulate a daytime course of the irradiance of solar radiation by using and controlling two or more neutral density filters when applying the device to a sun simulator.

FIG. 2 covers FIGS. 2A to 2D and illustrates a specific example of a fixture according to the first aspect. FIG. 2A shows a perspective view, while FIG. 2B to 2D show side views of the fixture from different directions.

FIG. 2 shows a device 20 for adjusting the irradiance of light emitted by a radiation source 21. From the radiation source 21, only the housing 21.1 is partially visible in all illustrations of FIG. 2, while the light source within the housing is not visible. The device 20 comprises a neutral density filter 22, which can be swiveled in front of the beam exit port or opening of the radiation source 21, whereby the beam exit port of the radiation source 21 is located below in the illustration of FIGS. 2A and 2B. In the position of the neutral density filter 22 shown, this is not in the light path of the radiation emitted by the light source, so that it is not filtered and its irradiance is not reduced.

The device 20 of FIG. 2 also comprises a first filter frame 24 to which the neutral density filter 22 is attached. The first filter frame 24 is shaped in such a way that the neutral density filter 22, which is formed flat in its initial or manufactured state, can be attached to the first filter frame 24 in such a way that it is arranged in the fixed state along a section of a cylindrical surface. The first filter frame 24 is formed for this purpose in such a way that it comprises a (rod) linkage which surrounds or borders a cylinder segment, holding straps 24.1 are arranged at the two opposite bent ends of the cylinder segment, which serve to fix the neutral density filter 22. The cylindrical segment can extend over an arc section in a range from 110° to 130°, in particular about 120°, so that the light emitted from the beam exit opening is detected at its entire opening angle.

The first filter frame 24 is also configured in such a way that in the area of the cylinder axis the first filter frame 24 is hinged to a mounting wall 230 at the opposite end faces of the cylinder segment bordered by its (rod) linkage, which mounting wall 230 is connected to the housing 21.1 of the radiation source 21. In the same way, a second filter frame 25 is attached to the mounting wall 230. The second filter frame 25 is constructed in a similar way to the first filter frame 24 and is only slightly smaller in its spatial dimensions, so that it can be swiveled around the radiation source 21 within the first filter frame 24. A second neutral density filter (not shown) can be attached to the second filter frame 25 in the same way as the first neutral density filter 22 to the first filter frame 24.

The first neutral density filter 22 and the second neutral density filter can be provided by woven and, if necessary, blackened stainless steel wires. They can have different tissue densities and therefore different degrees of transmission.

The device 20 according to FIG. 2 also comprises a first drive unit 26 and a second drive unit 27, the first drive unit 26 being connected to the first filter frame 24 and the second drive unit 27 to the second filter frame 25. As can be seen in FIGS. 2C and 2D, the two drive units 26 and 27 are located on opposite sides of the housing 21.1 and are attached to the respective mounting wall with suitable fasteners. The drive units 26 and 27 can be controlled independently of each other, so that the filter frames 24 and 25 connected to them can be swiveled independently of each other.

The device 20 according to FIG. 2 also has a standard filter frame 28 attached to the beam outlet opening. This can be used to accommodate additional filters 29. These can be spectral filters, for example, with which an adaptation of the emission spectrum of the light source to the solar spectrum can be achieved.

The device 20 also comprises mounting brackets 210 and 220, which are connected to the mounting walls 230 on opposite sides.

FIG. 3 comprises FIGS. 3A to 3C and shows views of further technical details of fixture 20 according to FIG. 2.

FIGS. 3A and 3B show a cross-sectional side view (A) and a perspective view (B) to illustrate the connection between a filter frame and a drive unit. The first drive unit 26 comprises a drive bracket or holder 26.1 which holds the main parts of the drive unit and is attached to the mounting wall 230. Otherwise, the first drive unit 26 comprises essentially a motor 26.2 and a drive shaft 26.3 connected to the motor 26.2. The drive shaft 26.3 is connected with two engaging pieces 26.4, between which the first filter frame 24 is fixed or mounted. From the outside, a cylindrical pin or stud 26.5 is guided through appropriate openings in the engaging pieces 26.4 and the first filter frame 24 and all the above-mentioned parts are connected to the drive shaft 26.3 by means of a screw 26.6.

FIG. 3C shows further details of the connection between the first filter frame 24 and the drive unit 26. The drive of the first filter frame 24 is achieved by means of a positive fit between the drive shaft 26.3 and the pin 26.5. On the one hand, the drive shaft 26.3 and the pin 26.5 are connected with each other by a positive fit and on the other hand, the first filter frame 24 and the pin 26.5 are connected with each other by a positive fit. For this purpose, the drive shaft 26.3 comprises a drive shaft form-fit element 26.31 and the pin 26.5 comprises a first form-fit element 26.51 and the form-fit elements 26.31 and 26.51 interlock. Furthermore, the first filter frame 24 comprises a filter frame form-fit element 24.2 and the pin 26.5 comprises a second form-fit element 26.52 and the form-fit elements 24.2 and 26.52 also interlock. Finally, the pin 26.5 comprises a sliding surface 26.53 for the bearing of the second filter frame (not shown). This is driven on the opposite side of the housing by the other drive unit 27 in the same way as the first filter frame 24 and glides freewheeling on the sliding surface 26.53. Similarly, the first filter frame 24 glides on a sliding surface of a corresponding pin or stud on the opposite side of the housing.

In this way, each of the two filter frames 24 and 25 is firmly connected to one of the drive units 26 and 27 by means of one of their frontal sections on each side of the device 20, while the opposite section of the filter frames 24 and 25 is mounted sliding on the sliding surface of the respective pin or stud.

The device 20 according to FIG. 2 also comprises side walls 230 and 240, which are connected to the opposite sides of the housing 21.1. The drive units 26 and 27 are each connected to one of the side walls 230 and 240.

FIG. 4 shows FIGS. 4A to 4D and shows different positions of the two neutral density filters for a device according to FIG. 2. Each of the states shown is represented in a side-view as well as in a perspective view from below. It is assumed that the first outer filter frame 24 contains a first neutral density filter 22 with a transmission rate of 30% and that the second inner filter frame 25 contains a second neutral density filter with a transmission rate of 50%.

Figure 1:
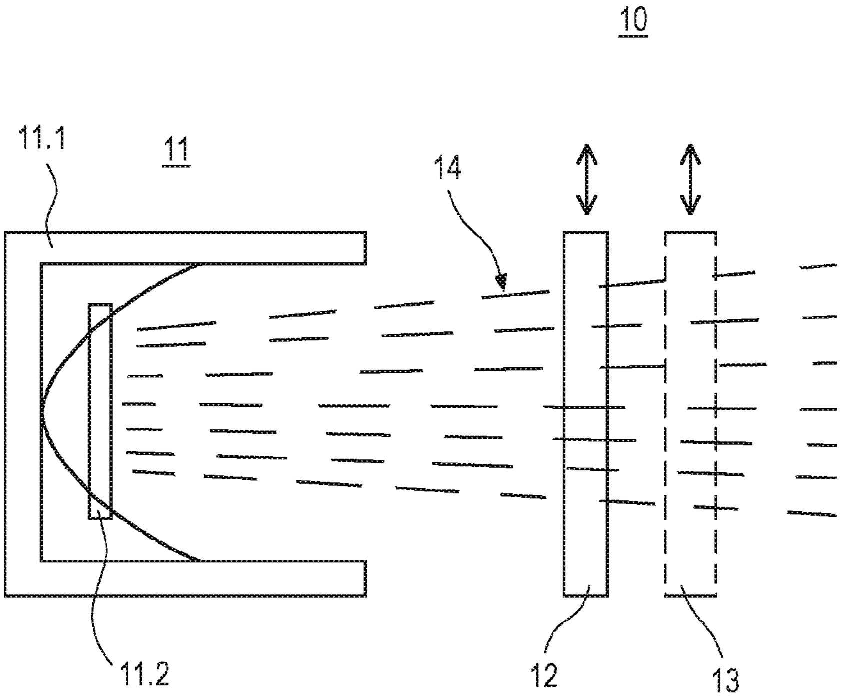
Figure 2A:
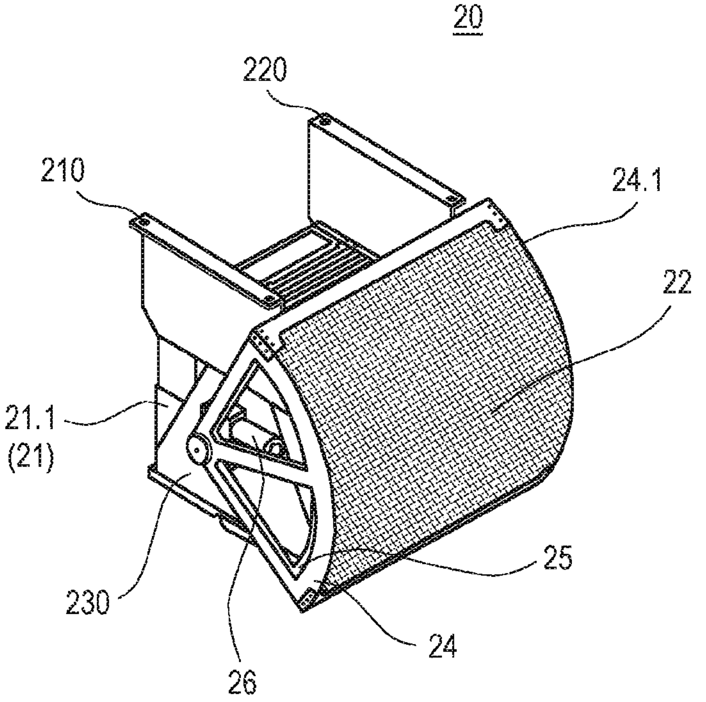
Figure 2B:
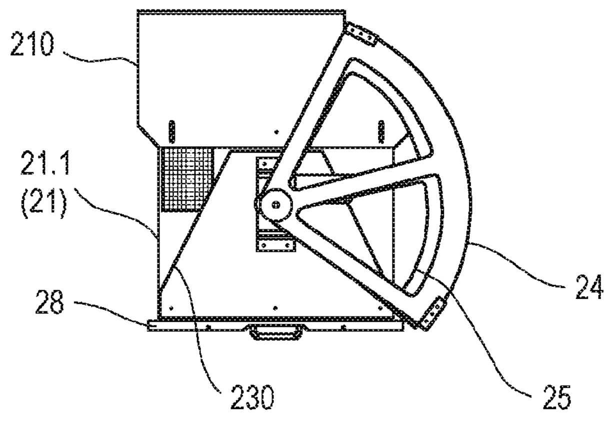
Figure 2C:
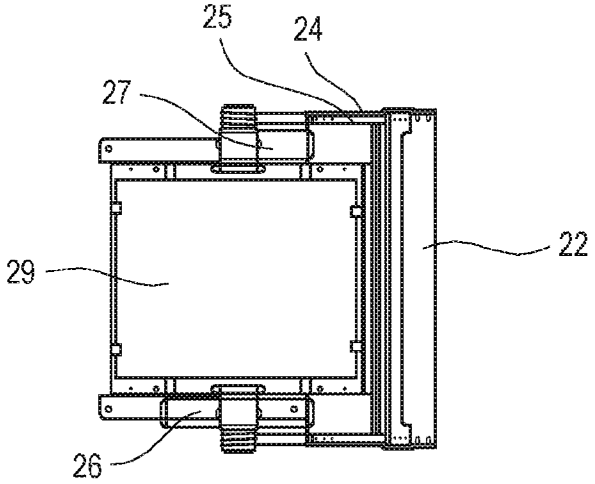
Figure 2D:
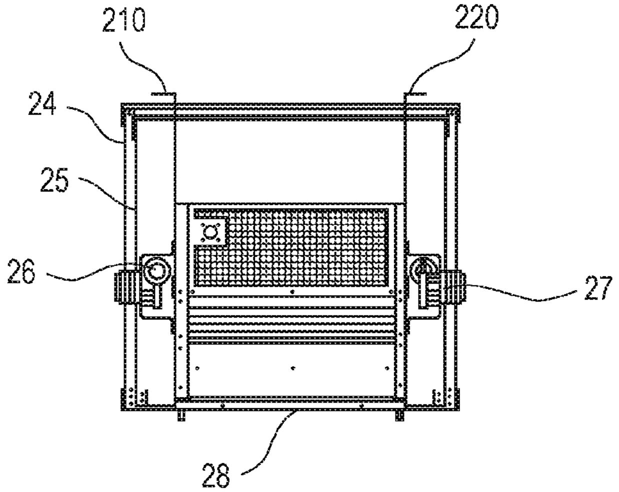
Figure 3A:
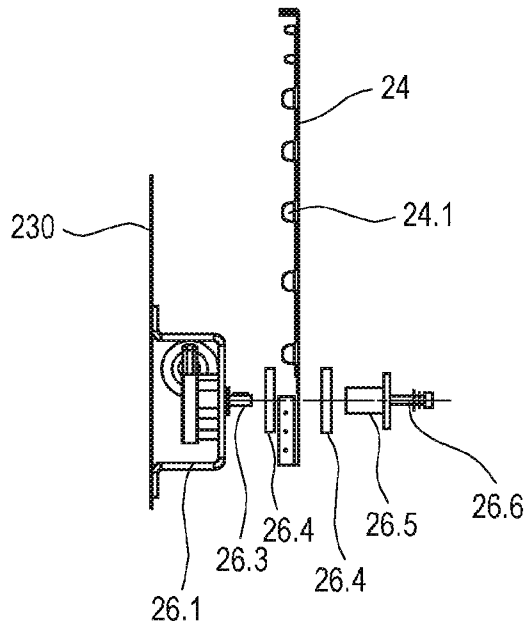
Figure 3B:
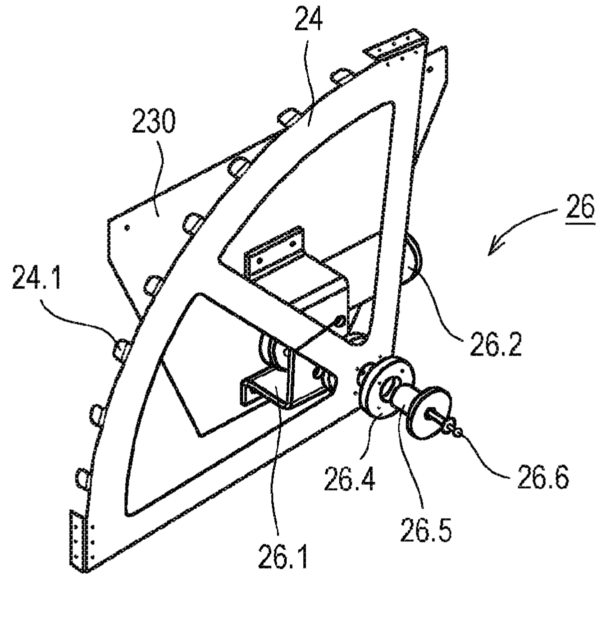
Figure 3C:
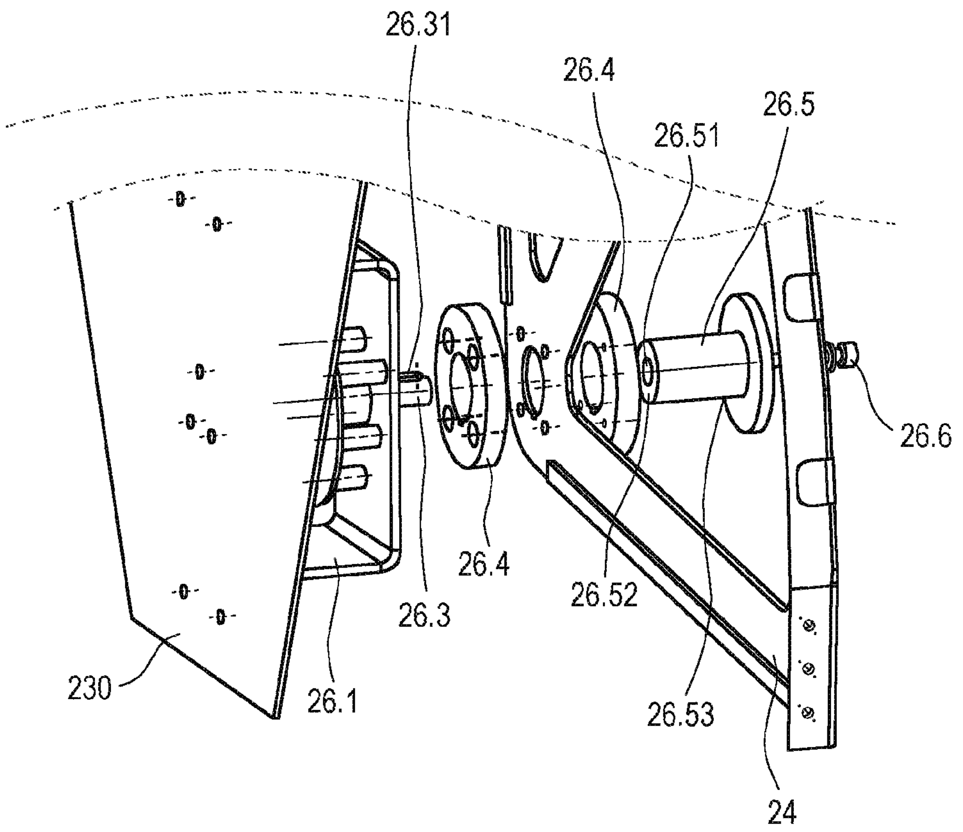
Figure 4A:
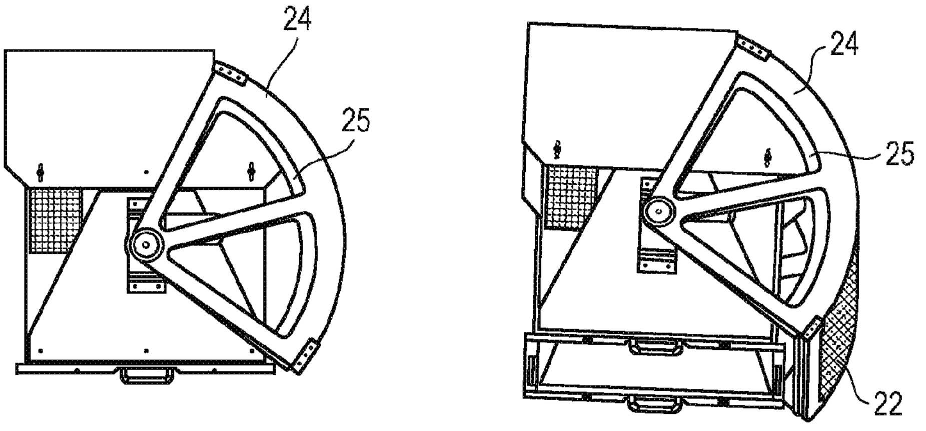
FIG. 4A shows a state in which both filter frames 24 and 25 are swung out, i.e. none of the neutral density filters are located in the beam path of the emanating light radiation. Thus, the irradiance is 100% of the light output emitted by the light source.
Figure 4B:
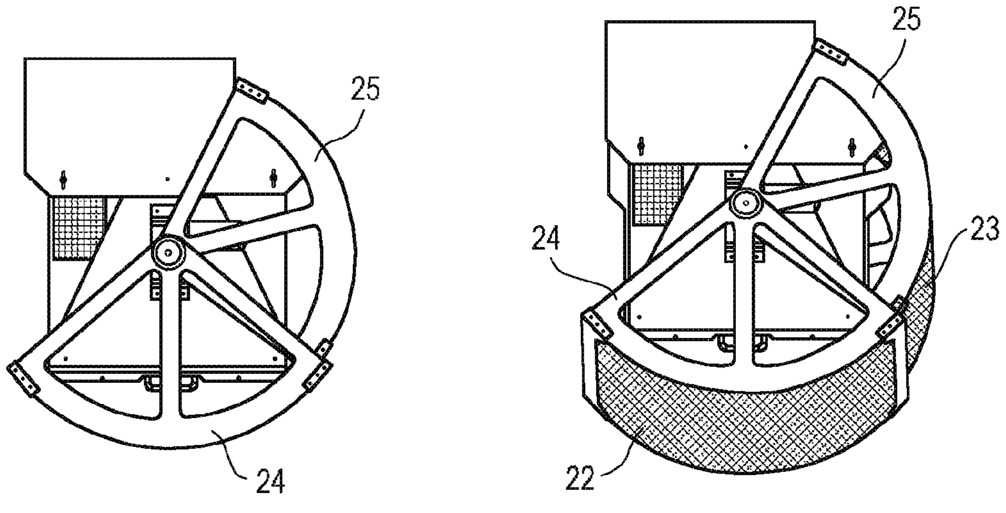
FIG. 4B shows a condition in which the first outer filter frame 24 is swiveled in front of the light outlet. Thus, the irradiance is 22 70% of the emitted radiant power due to the effect of the first 30% neutral density filter.
Figure 4C:
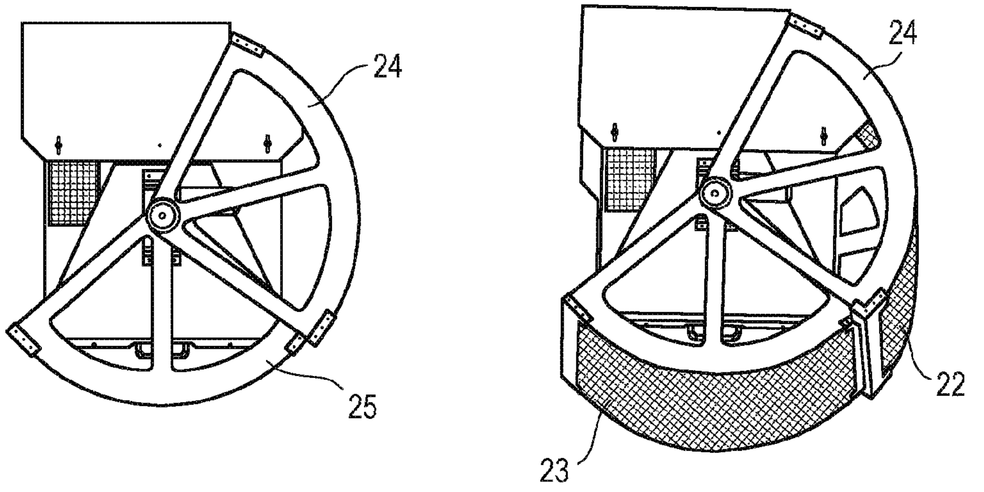

FIG. 4C shows a state in which the second filter frame 25 with the second neutral density filter 23 is swiveled in front of the outlet opening. Due to the effect of the 50%-neutral density filter 23, the irradiance is therefore 50% of the emitted light output.

Figure 4D:
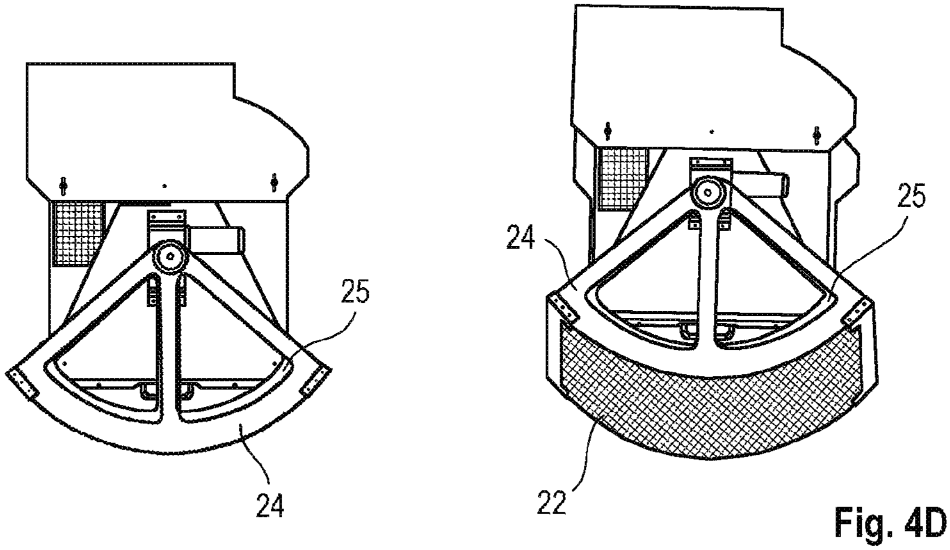

FIG. 4D finally shows a state in which both filter frames 24 and 25 are swiveled in front of the beam outlet opening. Thus, due to the effect of the first 30%-neutral density filter 22 and the second 50%-neutral density filter 23, the irradiance is 15% of the light output originally emitted by the light source.

As already mentioned above, the light output of the light source 11.2 can be adjustable or dimmable. For example, an electric ballast can be used to regulate the light output between 50% and 100%. Thus, the following control ranges result in this constellation for the use of the above filters:

Without filter: 50-100%.
With 30% filter: 35-70% filter
With 50% filter: 25-50%.
Both filters: 10-20%.

From the preceding it becomes clear that a device like the one described in FIG. 2 is ideally suited for use in a sun simulator, where the described change in the positions of the neutral density filters, for example, a course of daylight with changing sun positions and thus changing sunlight intensity, can be mapped very well.

According to a second aspect of the disclosure, a computer program product is designed to control a device according to the first aspect. According to an example of this, the computer program product can be connected to the drive units and control them in a way intended by the computer program product. The computer program product can contain a number of different operating modes. An operating mode can provide for certain irradiance levels, i.e. the total transmittance of the neutral density filters, to be set in a specified time sequence. In this way, a course of daylight can be modelled with changing sun positions and irradiance levels. Another operating mode can be used to model rapidly changing irradiance levels, such as during cloud formation or when driving into a tunnel. If necessary, the latter can also be coupled with a random generator. Both described operating modes can also be combined with each other. A simple operating mode can provide for a transmission factor to be entered manually by user input and then brought about by corresponding activation of the drive units. If the transmittance cannot be adjusted exactly by the available neutral density filters, this operating mode calculates the filter combination which best approximates the desired transmittance. According to another example, the computer program product is additionally connected to the light source or control unit such as the electronic ballast in order to control it, for example to set a certain point within a range between 50% and 100%. In this way, a desired temporal course of the light output can also be generated together with the selection of a certain filter.

Further examples of this second aspect may be given by combining it with other features as described above in connection with the first aspect or further down in connection with the fourth aspect.

According to a third aspect of the present disclosure, a woven metal wire or stainless steel wire is used as a neutral density filter in a device for adjusting the irradiance, in particular a device according to the first aspect.

Further examples of this third aspect may be obtained by combining it with other features as described above in connection with the first aspect or further down in connection with the fourth aspect.

Further examples of this third aspect can also be found in the selection of other types of filters for the neutral-density filter mentioned above.

In accordance with a fourth aspect, a device for testing the effect of light radiation on an object comprises at least one device according to the first aspect and a device for receiving or accommodating an object to be irradiated.

According to an example of the fourth aspect, a device for accommodating an object to be irradiated is designed to accommodate a motor vehicle.

Such a device for accommodating, or a so-called test bench, for motor vehicles can be used in particular to optimize air conditioning systems, for example with regard to rapid regulation at rapidly changing irradiance (cloud simulation and/or tunnel simulation).

According to an example of a device according to the fourth aspect, the device for receiving an object to be irradiated is configured to accommodate a plant growth chamber, in particular to investigate the influence of varying irradiance levels and to model or simulate geographical and seasonal day pathways.

According to an example of a device of the fourth aspect, the device for accommodating an object to be irradiated is configured to accommodate components or vehicles for military applications to model or simulate the influence of the daytime solar thermal load.

According to an example of a device of the fourth aspect, the device for accommodating an object to be irradiated is configured to accommodate assemblies from the construction industry, aircraft construction, sensors or photovoltaics, in particular to evaluate the influence of heat gradients produced by varying irradiance.

In accordance with an example of a device of the fourth aspect, the device for accommodating an object to be irradiated is configured to accommodate electronic devices or electronic components or switch cabinets, in particular to test the influence of the daytime solar heat load.

Further examples of a device according to the fourth aspect may result from combination with features as mentioned above in connection with the first, second or third aspect.

Although specific embodiments have been presented and described in this description, it is clear to the expert in the field that the specific embodiments shown and described can be exchanged for a variety of alternative and/or equivalent implementations without deviating from the scope of protection of the present invention. This notification is intended to cover any adaptation or modification of the specific forms of implementation discussed herein. Therefore, it is intended that this invention is limited only by the claims and their equivalents.

The invention claimed is:

1. A device for adjusting an irradiance, comprising:
a radiation source; and
two neutral density filters arranged adjacent to the radiation source, wherein:
the two neutral density filters are configured to be moved into or out of a beam path of radiation emitted by the radiation source,
the two neutral density filters each extend over a segment of one of two cylindrical surfaces spaced at different radii from a common cylinder axis on which the radiation source is located, and
the two neutral density filters are each independently of each other pivotable along the respective cylindrical surface around the radiation source.

2. The device according to claim 1, wherein:
the two neutral density filters each comprises a woven metal wire or a stainless steel wire.

3. The device according to claim 2, wherein:
the two neutral density filters have different density factors from each other.

4. The device according to claim 3, further comprising:
two filter frames in which the two neutral density filters are configured to be mounted, wherein one or more neutral density filters are configured to be mounted in a same filter frame of the two filter frames.

5. The device according to claim 4, further comprising:
two drive units connected to the two neutral density filters to set the two neutral density filters in motion.

6. The device according to claim 3, further comprising:
two drive units connected to the two neutral density filters to set the two neutral density filters in motion.

7. The device according to claim 2, further comprising:
two drive units connected to the two neutral density filters to set the two neutral density filters in motion.

8. The device according to claim 2, further comprising:
two filter frames in which the two neutral density filters are configured to be mounted, wherein one or more neutral density filters are configured to be mounted in a same filter frame of the two filter frames.

9. The device according to claim 8, further comprising:
two drive units connected to the two neutral density filters to set the two neutral density filters in motion.

10. The device according to claim 1, wherein:
the two neutral density filters have different density factors from each other.

11. The device according to claim 10, further comprising:
two drive units connected to the two neutral density filters to set the two neutral density filters in motion.

12. The device according to claim 10, further comprising: two filter frames in which the two neutral density filters are configured to be mounted, wherein one or more neutral density filters are configured to be mounted in a same filter frame of the two filter frames.

13. The device according to claim 12, further comprising: two drive units connected to the two neutral density filters to set the two neutral density filters in motion.

14. The device according to claim 1, further comprising: two filter frames in which the two neutral density filters are configured to be mounted, wherein one or more neutral density filters are configured to be mounted in a same filter frame of the two filter frames.

15. The device according to claim 14, further comprising: two drive units connected to the two neutral density filters to set the two neutral density filters in motion.

16. The device according to claim 1, further comprising: two drive units connected to the two neutral density filters to set the two neutral density filters in motion.

17. A computer program product, which is configured to control the device of claim 1.

18. A device for testing the effect of light radiation on an object, comprising:

a first device for adjusting an irradiance, comprising:

a radiation source; and two neutral density filters arranged adjacent to the radiation source, wherein:

the two neutral density filters are configured to be moved into or out of a beam path of light radiation emitted by the radiation source, the two neutral density filters each extend over a segment of one of two cylindrical surfaces spaced at different radii from a common cylinder axis on which the radiation source is located, and the two neutral density filters are each independently of each other pivotable along the respective cylindrical surface around the radiation source; and a second device for receiving an object to be irradiated.

* * * * *